United States Patent [19]

Holmes

[11] Patent Number: 4,471,948
[45] Date of Patent: Sep. 18, 1984

[54] CUTTING APPARATUS

[75] Inventor: Roy J. Holmes, Bishop's Stortford, England

[73] Assignee: BOC Limited, London, England

[21] Appl. No.: 408,090

[22] Filed: Aug. 13, 1982

[30] Foreign Application Priority Data

Aug. 19, 1981 [GB] United Kingdom ............... 8125369
Jun. 18, 1982 [GB] United Kingdom ............... 8217691

[51] Int. Cl.³ ............................................. B23K 7/10
[52] U.S. Cl. ....................................... 266/77; 266/58
[58] Field of Search ................... 266/77, 58; 148/9 R

[56] References Cited

U.S. PATENT DOCUMENTS 1,565,824 12/1925 Stevens et al. ...................... 266/58
1,691,007 11/1928 Chowe et al. ....................... 266/58
3,908,973 9/1975 Martin ............................. 148/9 R

FOREIGN PATENT DOCUMENTS 608866 11/1948 United Kingdom .
1111900 5/1968 United Kingdom .
1043953 9/1968 United Kingdom .

Primary Examiner—W. Stallard
Attorney, Agent, or Firm—David A. Draegert; Larry R. Cassett

[57] ABSTRACT

A cutting apparatus for cutting a longitudinally extending member such as rail comprises a frame; means for clamping the frame to the member to be cut; and a cutting torch which is pivotally attached to the frame. A pivoted torch holder is provided having bearing means permitting axial displacement of the torch relative to the member to be cut. The precise axial distance of the tip of the torch relative to the member to be cut is determined throughout the making of the cut by means comprising a plate attached to the frame and defining a cam surface and a cam follower connected to the torch. The shape of the cam surface thus makes it possible for the path described by the tip of the torch to conform, if desired, to the profile of the member to be cut.

9 Claims, 3 Drawing Figures

CUTTING APPARATUS

BACKGROUND OF THE INVENTION

This invention relates to cutting apparatus, particularly but not exclusively to cutting apparatus for transversely cutting through complexly shaped, longitudinally-extending members such as rails.

In order to repair or replace damaged rail welds it is frequently found necessary to cut the weld out of the rail. This is currently done using an oxygen-fuel gas torch. In order to help the cutting operative make the cut it is known to fix over the rail a template having three spaced apart torch holding pegs (or sockets) to which complementary sockets (or pegs) attached to the torch may be fitted. The torch may be pivoted about each associated peg to enable the cut to be made in three parts. In practice, this arrangement has suffered from the disadvantage that frequently the three parts of the cut are made such that they leave a cut section having a non-planar face.

Rail cutting machines have been proposed in which the cutting torch is connected to an articulated arm to enable the torch to be moved about the section to be cut at a substantially constant distance from the section determinable by the setting of a lead. Such machines suffer from the disadvantage that the lead screw is liable to be damaged or worn in use.

OBJECTS OF THE INVENTION

It is an object of the present invention to provide rail cutting apparatus which is operable to make a planar cut and in which the axial distance of the tip of the cutting torch from the member to be cut can be predetermined.

Other objects of the present invention will become apparent from the detailed description of exemplary embodiments thereof which follows, and the novel features of the present invention will be particularly pointed out in conjunction with the claims appended hereto.

SUMMARY

According to the present invention there is provided cutting apparatus including a cutting torch which is pivotally movable in the plane of the cut and whose cutting tip is axially displaceable relative to the member to be cut, means for locating the apparatus in relation to the member to be cut, a member defining a cam surface, and a cam follower connected to the torch, the arrangement of cam surface and cam follower being adapted to determine the axial position of the tip of the torch relative to the member to be cut throughout the making of the cut.

The apparatus according to the invention preferably additionally includes a pivoted support arm for the torch substantially parallel to the axis thereof, and a bearing assembly holding the torch and being secured to the arm, the bearing assembly permitting axial displacement of the torch relative to the member to be cut.

The cutting torch is preferably of the oxy-acetylene kind. Such a torch is able to generate a relatively high cutting temperature which facilitates the severing of a rail from one side thereof and hence the making of a planar cut.

The arm is typically pivoted to a shaft rotatable by hand. This enables the operator to adjust the speed at which the torch is moved in relation to the member to be cut according to thickness in the plane in which the axis of the torch for the time being lies. Alternatively the torch may be motor driven. The shaft is typically connected to the arm through a gear box.

The support arm is preferably pivotally connected to a support frame having means for clamping the frame to the member to be cut. Typically, the clamping means comprises a clamping bar able to be positively held in a clamping position under the pressure of a (e.g. compression) spring by means of a toggle.

In order to facilitate the location of the apparatus according to the invention relative to the member to be cut, the support frame typically includes a pair of parallel, spaced-apart plates, shaped to be fitted over the member (e.g. a rail) to be cut. The plates may have stops or locating members which bear against the rail or other members to be cut when the apparatus according to the invention is clamped in position.

The member defining the cam surface preferably comprises a plate having a groove or slot therein defining the cam surface, the plate being attached to the support frame and being located essentially parallel to the axis of the cutting torch. The cam surface is typically so shaped as to keep the tip of the cutting torch at a substantially constant distance from the member to be cut throughout at least a major portion of the cut.

In for example the cutting of rails forming part of tracks in place, it is typically found that different track may use differently shaped or dimensioned rail sections. In order for the apparatus according to the invention to be able to cater for this, the cam plate is preferably demountably attached to the frame (e.g. to one of the parallel plates). This makes it possible for a cam plate designed for one rail section to be readily substituted for a cam plate designed for another rail section.

The position of the cam plate on the frame is typically chosen to be such that the tip of the cutting torch is in the optimum position relative to the member to be cut throughout the making of the cut. In the cutting of, for example, rails it is typically found that different rails of the same type may have different degrees of wear, particularly on its head. It is desirable to compensate for such wear so as to provide an apparatus in which the tip of the cutting torch is always in an optimum or near-optimum position during the making of the cut. Accordingly, the apparatus preferably includes locating members which are able to bear against a surface of the member to be cut liable to wear which are adjustable between different positions to select the position of the cam plate relative to said surface. Typically in rail cutting, such surface is the head of the rail and the precise position of the cam plate in a vertical plane can be selected so as to compensate for different degrees of wear. Such locating members may be of square or polygonal cross-section and be eccentrically mounted on a shaft or the like, the locating members being adjustable to bring different faces of the square or polygon to bear on the said surface, whereby different positions of the cam plate relative to the said surface may be selected.

BRIEF DESCRIPTION OF THE DRAWINGS

A preferred embodiment of cutting apparatus according to the invention will now be described by way of example with reference to the accompanying drawings, in which.

DESCRIPTION OF PREFERRED EMBODIMENTS

Figure 1:
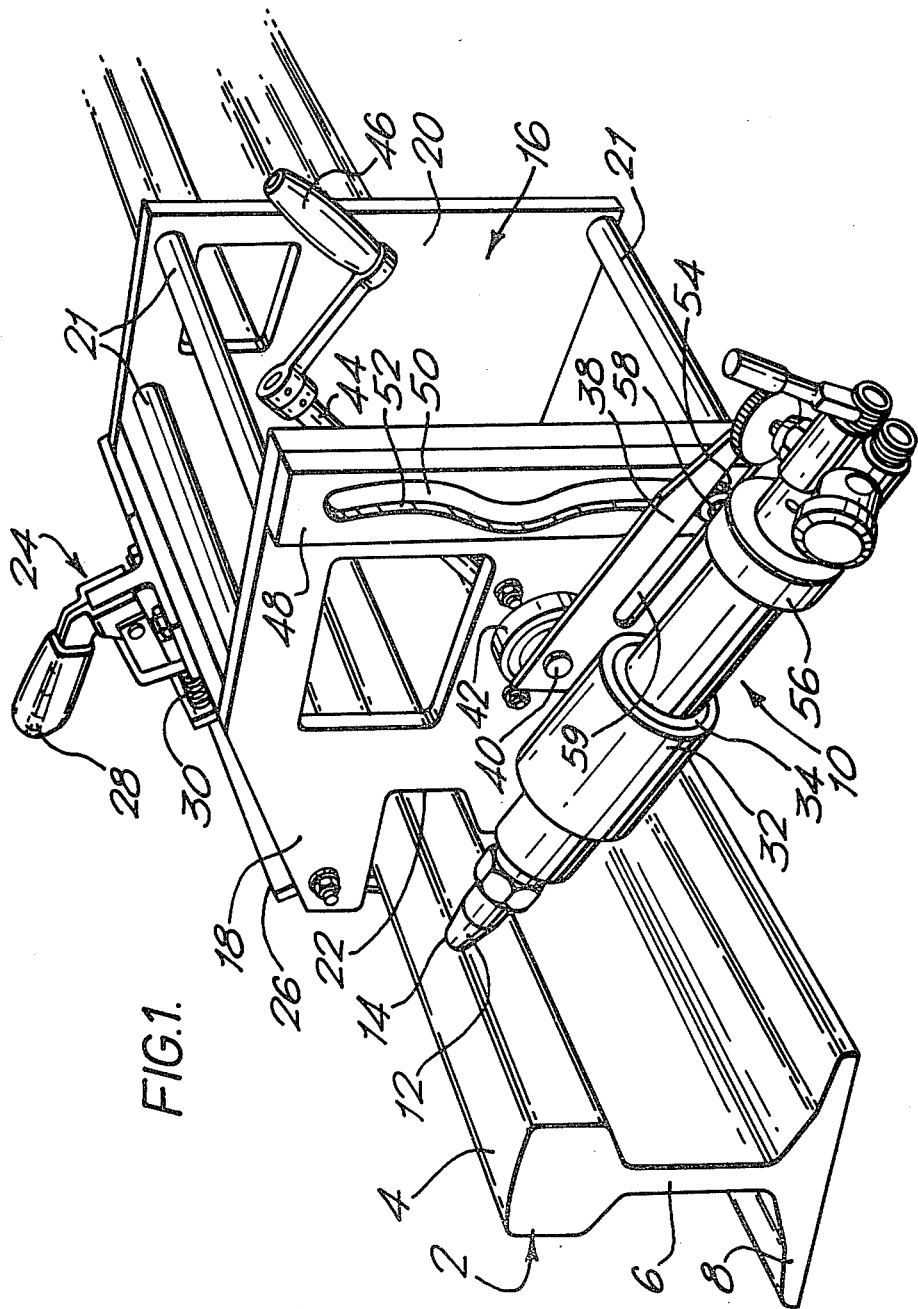
FIG. 1 is a schematic perspective view of the cutting apparatus.
Figure 2:
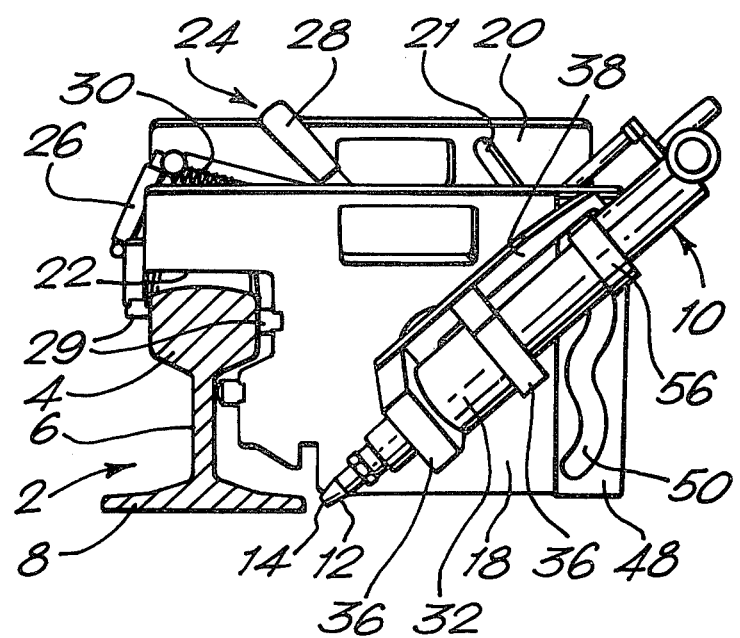
FIG. 2 is a schematic side view of the apparatus shown in FIG. 1.

Referring to FIGS. 1 and 2 of the drawings, an embodiment of cutting apparatus according to the invention is shown clamped to rail 2. In the drawings the head of the rail is indicated by the reference numeral 4, the web of the rail by reference numeral 6, and the foot of the rail by reference numeral 8.

The illustrated cutting apparatus includes a conventional oxy-acetylene cutting torch 10 having a cutting nozzle 12 whose tip is indicated by the reference number 14. The cutting torch 10 is pivotally attached to a support frame 16. The support frame 16 has vertical spaced-apart plates 18 and 20 extending generally parallel to each other and being connected to each other by transverse connecting rods 21. The plates 18 and 20 each have a forward edge 22 (with, if desired, locating members 29) shaped to fit over a rail. At the forward end of the support frame 16 is a toggle clamp 24 having a clamping bar 26. By fitting the support frame 16 over the head of the rail and depressing a handle 28 forming part of the toggle clamp 24 the clamping bar 26 (or locating members 29 secured thereto) is held hard against the far side of the head 4 of the rail by the bias of a compression spring 30 forming part of the toggle clamp 24. With the frame clamped to the rail 2, the plates 18 and 20 are positioned general perpendicularly to the longitudinal axis of the rail 2. The torch 10 is mounted to the frame such that its (longitudinal) axis is essentially parallel to the plates 18 and 20, the torch being held outside the support frame 16 at the side of the plate 18. The torch is supported by an axial bearing assembly 32 of the recirculating ball kind, whereby axial displacement of the torch is permitted. Annular wiper seals 34 (of which only one is shown in FIG. 1) are engaged between the bearing assembly 32 and the torch 10 to prevent ingress of moisture into the bearing assembly 32.

The bearing assembly 32 is held by a holder 36 (omitted from FIG. 1) which is secured to a pivoted arm 38 extending generally parallel to the axis of the torch 10. The arm 38 pivots in a vertical plane being mounted on a shaft 40 extending from a combined rotary bearing and gear box assembly 42 which is secured to the plate 18. The arm 38 (and hence the torch 10) is rotatable in a vertical plabe about its pivot by manually turning a hand crank 46 which is connected by rod 44 to a shaft (not shown) extending into the gear box assembly 42 from the side opposite to the arm 38. The gear box may be arranged such that clockwise rotation of the hand crank 46 lowers the tip 14 of the torch 10 and anti-clockwise rotation raises the tip 14 of the torch 10.

A cam plate 48 is demountably attached to the side of the plate 18 facing the cutting torch 10. The plate 48 has in it a slot or groove 50 along which a cam follower 54 is able to run.

The cam follower 54 is connected by a shaft 58 extending through a slot 59 in the arm 38 to a torch holder 56 which fixedly grips the torch 10 preventing axial displacement of the torch relative thereto (but not relative to the rail 2).

The groove or slot 50 lies in a plane generally parallel to the axis of the torch 10 and extends generally vertically. The groove or slot 50 (and particularly its edge 52) follows a path that predetermines the axial distance of the tip of the cutting torch 10 from the rail 2 at any point in the cut. The groove or slot 50 (and its edge 52) is shaped so as to keep the axial distance between the tip of the torch 10 and the rail 2 substantially constant during the making of a (transverse) cut through rail 2, though at the region where the web 6 merges into the foot 8 the cam groove or slot 50 may be arranged so as to position the tip 14 of the torch 10 closer to the rail 2 than in other regions. (This is because at the region where the web 6 merges into the foot 8 the axial section the torch 10 has to cut through at its thickest).

In order to make a cut through a rail forming part of a rail track (for example to remove a damaged weld) the frame 16 is clamped to the rail 2, and the torch 10 connected to cylinders (not shown) of oxygen and acetylene. A flame is then produced. The cut is typically made from head to foot of the rail, the speed at which the torch is moved is the plane of the cut being driven by the operator according to the speed at which he rotates the hand crank 46.

The operator is able to move the torch more slowly through thicker sections to be cut. The illustrated apparatus makes it possible to make a vertical planar cut through a rail in situ in a track without depending on the skill of the operator to determine the position of the tip 14 of the cutting torch 10 relative to the rail to be cut. Moreover, the cut is made from just one side of the member to be cut.

Not all rails in use today have identical sections. Different cam plates 48 may accordingly be made for each type of rail, and the appropriate cam plate for any particular rail secured to the apparatus before making the cut.

In the cutting apparatus shown in FIGS. 1 and 2 the vertical position of the cam plate relative to the head of the rail to be cut is not adjustable. A modification to the apparatus shown in FIG. 3 whereby the vertical position of the cam plate relative to the head of the rail can be selected to cater or compensate for different degrees of wear.

Figure 3:
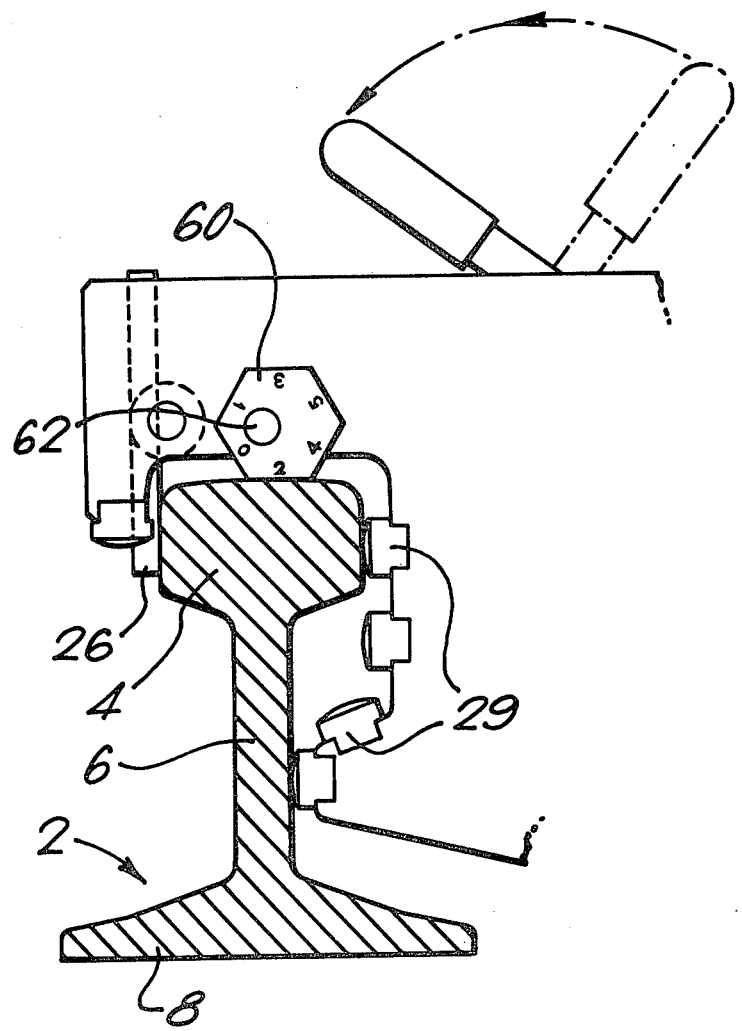
FIG. 3 is a side view of part of a modified cutting apparatus according to the invention.

Referring to FIG. 3, the plates 18 and 20 of the frame are each provided with adjustable locating members 60 (only one shown in FIG. 3). Each member 60 is of generally regular hexagonal cross-section and is mounted such that when the cutting apparatus is clamped to the rail, one face of the hexagon bears against the top of the rail head and thus determines the precise vertical position of the plates 18 and 20 and hence the cam plate relative to the head of the rail to be cut. The members 60 are mounted on an off-set or eccentrically positioned shaft 62 extending through the plates 18 and 20 and coplanar with the longitudinal axis of the rail. Thus, the vertical distance between the rail head and the axis of the shaft 62 can have any one of six different values according to which of the respective faces of the hexagonal members bears against the head of the rail. Typically the shaft 62 may be rotatable against spring bias and may be provided with locating means which co-operate with complementary means on the frame to locate positively the members 60 in each one of their six positions as aforesaid.

Typically, the position of the locating members to be employed for any rail to be cut is ascertained by measuring the height of the rail to be cut. A simple gauge may be calibrated to give a reading of different locating member 60 position (shown as 0 to 5 in FIG. 3) according to the degree of rail head wear for each type of rail to be cut. Different cam plates 48 will be used with different rail profiles to be cut.

The cutting apparatus may be adapted to cut other members than rails, the cam plate having a groove shaped in accordance with the member to be cut. This and other various changes in form and in detail may be made without departing from the spirit and scope of the present invention. Consequently, it is intended that the appended claims be interpreted as including all such changes and modifications.

I claim:

1. A cutting apparatus for cutting a member, comprising
   a cutting torch;
   a frame for locating the torch in relation to the member to be cut;
   an arm for supporting the torch;
   a bearing assembly secured to the supporting arm for receiving the torch and permitting axial displacement of the torch relative to the supporting arm;
   a pivot for enabling rotation of the supporting arm and hence the torch with respect to the fram;
   a means for rotating the pivot and hence the support arm and torch;
   a member defining a cam surface fixed to the frame;
   a cam follower attached to the torch, said cam surface and cam follower being arranged such that on rotation of the torch, the cam surface determines the axial position of the tip of the torch relative to the member to be cut throughout the cut.

2. Cutting apparatus according to claim 1 in which the arm is pivoted to a shaft rotatable by hand and the shaft is connected to the arm through a gear box.

3. Cutting apparatus according to claim 1, having means for clamping the frame to the member to be cut.

4. Cutting apparatus according to claim 1, in which the clamping means comprises a clamping bar able to be positively held in a clamping position under spring pressure by means of a toggle.

5. Cutting apparatus according to claim 1 in which the member defining the cam surface comprises a plate having a groove or slot therein defining the cam surface, the plate being attached to the support frame including a pair of parallel spaced apart plates shaped to be fitted over the member to be cut and located essentially parallel to the axis of the cutting torch.

6. Cutting apparatus according to claim 5, in which the said cam plate is demountably attached to the frame.

7. Cutting apparatus for cutting a longitudinally-extending member, comprising a support frame for locating the apparatus in relation to the longitudinally-extending member to be cut; a cutting torch; a torch holder for holding the torch; bearing means forming part of the torch holder for permitting axial displacement of the torch; a support arm to which said torch holder is connected; pivot means connecting said support arm to the support frame; means for causing the movement of said torch holder about its pivot, whereby said torch can be pivoted such that its axis moves in the plane of the cut; and means for determining the axial position of the tip of the torch relative to the member to be cut throughout the making of a cut, such position determining means comprising a fixed plate, defining a cam surface, attached to the frame and a cam follower connected to the torch.

8. Cutting apparatus according to claim 7 additionally including at least one locating member, which is able to bear against a surface liable to wear of the member to be cut and which is adjustable between different positions to select the position of the cam plate relative to said surface.

9. Cutting apparatus as claimed in claim 8, in which said locating member(s) are if square or polygonal cross-section, being eccentrically mounted on a shaft and being adjustable to select which face of the square or polygon is to break against said surface.

* * * * *